United States Patent
Schmitt et al.

(10) Patent No.: US 12,440,272 B2
(45) Date of Patent: Oct. 14, 2025

(54) INTERNAL SECONDARY CALCULUS FRAGMENTATION MECHANISM

(71) Applicant: GYRUS ACMI, INC., Westborough, MA (US)

(72) Inventors: Jeffrey M. Schmitt, Bolton, MA (US); Charles Baker, Rogers, MN (US); Kristen R. Toutant, Denver, CO (US); Susanna L. Mayo, Boston, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 93 days.

(21) Appl. No.: 17/399,226

(22) Filed: Aug. 11, 2021

(65) Prior Publication Data

US 2022/0047332 A1   Feb. 17, 2022

Related U.S. Application Data

(60) Provisional application No. 63/065,836, filed on Aug. 14, 2020.

(51) Int. Cl.
*A61B 18/26* (2006.01)
*A61B 17/22* (2006.01)
(Continued)

(52) U.S. Cl.
CPC .... *A61B 18/26* (2013.01); *A61B 2018/00202* (2013.01); *A61B 2018/00511* (2013.01);
(Continued)

(58) Field of Classification Search
CPC .......... A61B 18/26; A61B 2018/00202; A61B 2018/00511; A61B 2018/00535;
(Continued)

(56) References Cited

U.S. PATENT DOCUMENTS

| | | | |
|---|---|---|---|
| 2002/0002366 A1* | 1/2002 | Grasso, III | A61B 18/26 606/2.5 |
| 2005/0059981 A1* | 3/2005 | Poll | A61B 17/22012 606/128 |

(Continued)

FOREIGN PATENT DOCUMENTS

| | | |
|---|---|---|
| CN | 116075275 A | 5/2023 |
| DE | 112021004281 T5 | 6/2023 |

(Continued)

OTHER PUBLICATIONS

"International Application Serial No. PCT/US2021/045499, International Search Report mailed Oct. 27, 2021", 6 pgs.

(Continued)

*Primary Examiner* — Joseph A Stoklosa
*Assistant Examiner* — Annie L Shoulders
(74) *Attorney, Agent, or Firm* — Schwegman Lundberg & Woessner, P.A.

(57) ABSTRACT

The present disclosure includes a calculi fracture device having an acoustic transducer for transferring acoustic energy via a primary fragmentation probe to fracture a calculi mass into calculi fragments, an evacuation tube connecting the probe to a pressure source, and a secondary fragmentation device located in an evacuation pathway extending along the fragmentation probe and the evacuation tube to further break up the calculi fragments to inhibit clogging at a more proximal location in the evacuation pathway. A method of inhibiting clogging of a calculi fracture device can include receiving, from a primary fragmentation device, fragments of a calculi mass along a passage of a evacuation pathway of the calculi fracture device and further breaking up the calculi fragments along the passage of the evacuation pathway at a location that is more proximal to a primary fragmentation location.

12 Claims, 6 Drawing Sheets

(51) Int. Cl.
  *A61B 17/32* (2006.01)
  *A61B 18/00* (2006.01)

(52) U.S. Cl.
  CPC .......... *A61B 2018/00535* (2013.01); *A61B 2218/002* (2013.01); *A61B 2218/007* (2013.01)

(58) Field of Classification Search
  CPC ........ A61B 2218/007; A61B 2218/002; A61B 2017/32008; A61B 18/245; A61B 2217/005
  See application file for complete search history.

(56) References Cited

U.S. PATENT DOCUMENTS

| | | | | |
|---|---|---|---|---|
| 2010/0100112 | A1* | 4/2010 | Kauker | A61B 17/32002 606/180 |
| 2011/0282324 | A1* | 11/2011 | Kurokawa | A61B 17/12186 604/514 |
| 2013/0103067 | A1* | 4/2013 | Fabro | A61B 17/32002 606/170 |
| 2018/0280045 | A1* | 10/2018 | Malhi | A61B 18/1492 |
| 2019/0142453 | A1* | 5/2019 | Efremkin | A61B 17/320758 606/7 |
| 2021/0353321 | A1* | 11/2021 | Jezierski | A61B 34/20 |

FOREIGN PATENT DOCUMENTS

| | | |
|---|---|---|
| JP | S62127041 A | 6/1987 |
| JP | S62261348 A | 11/1987 |
| JP | H05112731 A | 5/1993 |
| JP | 2007325925 A | 12/2007 |
| JP | 2016059710 A | 4/2016 |
| WO | WO-2019176171 A1 | 9/2019 |
| WO | WO-2019239375 A2 | 12/2019 |
| WO | WO-2022035937 A1 | 2/2022 |

OTHER PUBLICATIONS

"International Application Serial No. PCT/US2021/045499, Written Opinion mailed Oct. 27, 2021", 8 pgs.

"International Application Serial No. PCT/US2021/045499, International Preliminary Report on Patentability mailed Feb. 23, 2023", 10 pgs.

"Japanese Application Serial No. 2023-510425, Notification of Reasons for Refusal mailed Jan. 9, 2024", w/ English Translation, 10 pgs.

"Japanese Application Serial No. 2023-510425, Final Notification of Reasons for Rejection mailed Apr. 30, 2024", w/ English translation, 4 pgs.

"Japanese Application Serial No. 2023-510425, Response filed Mar. 29, 2024 to Notification of Reasons for Refusal mailed Jan. 9, 2024", W/English Claims, 18 pgs.

* cited by examiner

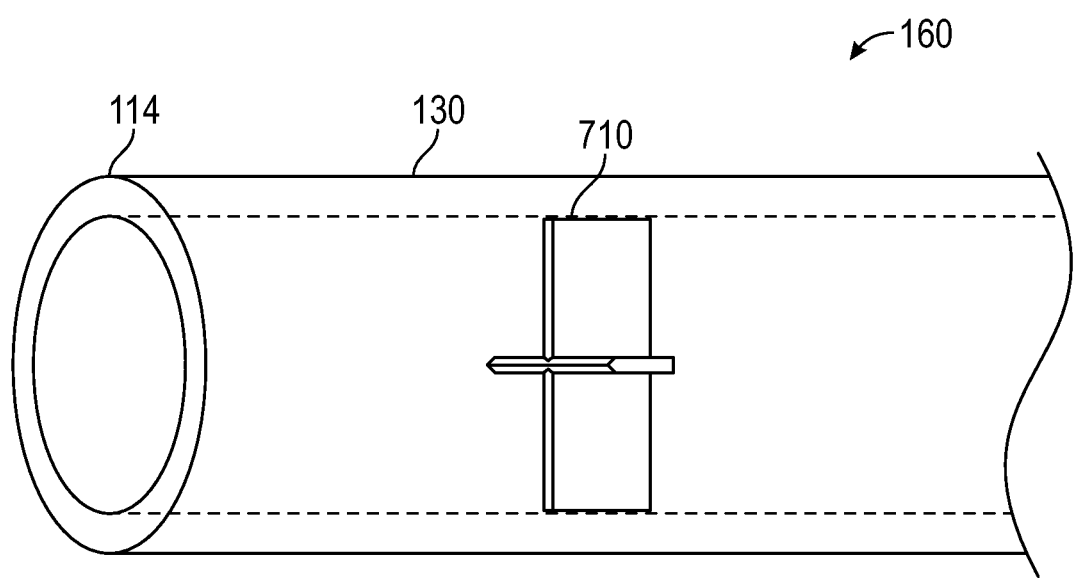
FIG. 7A
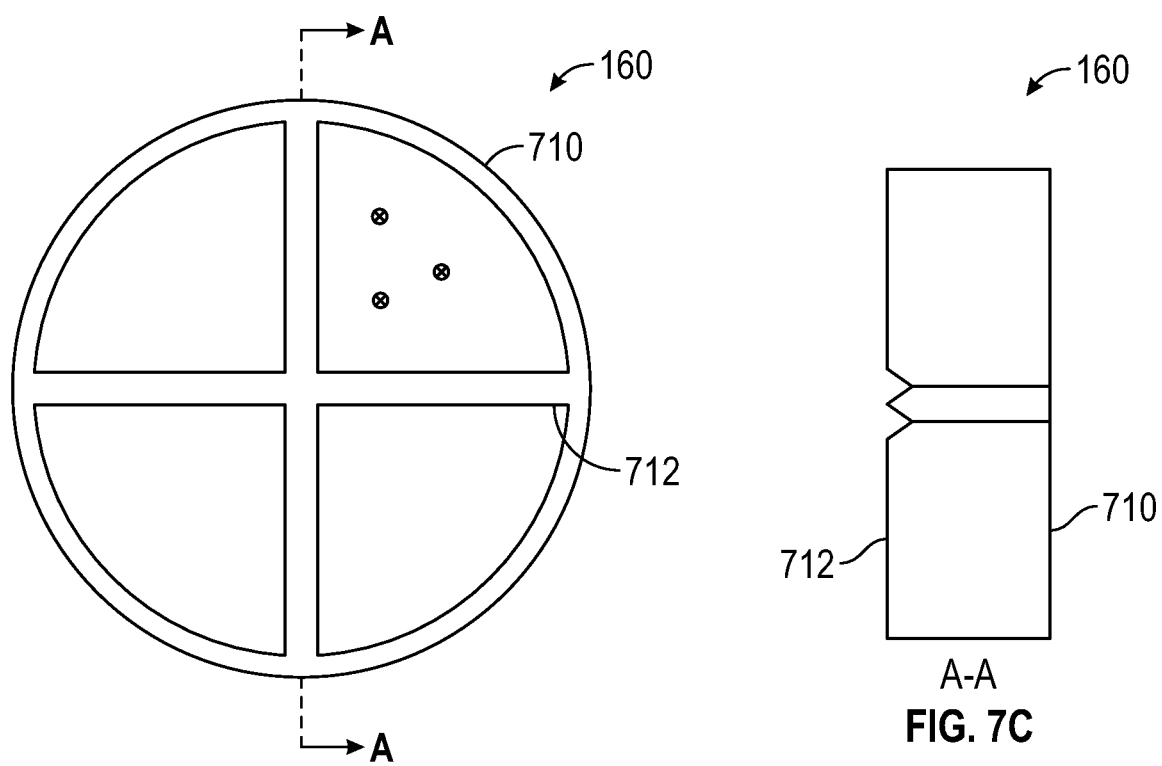
FIG. 7B
FIG. 7C

INTERNAL SECONDARY CALCULUS FRAGMENTATION MECHANISM

CROSS-REFERENCE TO RELATED APPLICATION

This application claims the benefit of priority to U.S. Provisional Patent Application No. 63/065,836, filed Aug. 14, 2020, the contents of which are incorporated herein by reference in their entirety.

TECHNICAL FIELD

The present document relates to techniques for breaking obstructions, such as physiological calculi or "calculi" using lithotripsy, and more particularly to techniques for breaking the obstructions such as using laser lithotripsy.

BACKGROUND

Medical endoscopes were first developed in the early 1800s and have been used to inspect inside the body. A typical endoscope has a distal end comprising an optical or electronic imaging system and a proximal end with controls such as for manipulating the device or for viewing the image. An elongate shaft connects the proximal and distal ends. Some endoscopes allow a physician to pass a tool down one or more working channels, for example, to resect tissue or retrieve objects.

Over the past several decades, several advances have been made in the field of endoscopy, and in particular relating to the breaking up of physiologic calculi in the bile ducts, urinary tract, kidneys, and gall bladder. Physiological calculi in these regions may block ducts and cause a patient a substantial amount of pain and therefore must be broken down and/or removed. Different techniques have been developed to break up calculi, including ultrasonic or other acoustic lithotripsy, pneumatic lithotripsy, electro-hydraulic lithotripsy (EHL), and laser lithotripsy such as can include breaking up of calculi using a green light, YAG, or holmium laser.

SUMMARY OF THE DISCLOSURE

The present disclosure provides, among other things, devices and methods for preventing, inhibiting, or remediating clogging in a calculi fracture device, such as in an acoustic probe used for calculi fragmentation and treatment. The devices and methods herein can include a secondary calculi fragmentation mechanism, such as along an evacuation pathway for removing calculi or fragments of calculi generated by a more distal primary fragmentation mechanism. Such further fragmentation of calculi or calculi fragments can help prevent, inhibit, or remediate clogs along the evacuation pathway that may otherwise occur without the assistance of such secondary fragmentation. This, in turn, can help provide the user with more continuous operation of the calculi fracture device, while secondary fragmentation is occurring, without the procedure being impeded by clogging along the evacuation pathway that may otherwise occur.

In calculi fracture procedures, such as using an acoustically transmissive probe for breaking down a calculi mass in the patient, the calculi fracture device can clog, such as along an evacuation pathway to which suction is applied to remove fragmentation detritus. The evacuation pathway can extend, for example, from the calculi fracture device tip near the targeted calculi mass, through the device body, and can include a suction or evacuation tube connected to the device along which suction is applied for removal of fragments. For example, where a calculi mass is fragmented, fractured, or dusted, the resulting calculi fragments can clog the device, such as at a probe tip, within the probe body, near an ultrasound transducer, in an attached suction passage, or elsewhere in or along the evacuation pathway, or at one or more combinations of such locations. Such a clog can impede or occlude the evacuation pathway, which can lessen or even stop subsequent evacuation during the procedure, making subsequent removal of such additional calculi fragments from the patient and device more difficult. In some cases, the operator may even need to stop the procedure when there is a clog, such as to manually clear the clog from the evacuation tube of the device, which may require the help of additional personnel, such as a technician or nurse. Anti-clogging can sometimes be done manually using a cleaning tool, but sometimes one or more portions of the device must be disassembled to allow access to a clogged portion of the evacuation tube to loosen or reduce or remove the clog. In extreme instances, a backup device must be used to replace the clogged device. Preferably, an operator would be able to avoid or otherwise address clogging without having to halt the procedure for manual anti-clogging.

An additional secondary fragmentation mechanism can serve as an anti-clogging mechanism, such as can be integrated into or otherwise included on-board the calculi fracture device, such as at one or more locations along the evacuation pathway that can be more proximal to the primary fragmentation mechanism. The secondary fragmentation mechanism can help further crush, disintegrate, or reduce the size of calculi fragments such as to inhibit, prevent, or disrupt clogging, such as at one or more joints, pinch points, or other clog-prone areas along the evacuation pathway within or coupled to the handheld device. Such a secondary fragmentation mechanism can include one or more of an impeller or grinder or other mechanical fragmentation device, or an optical fragmentation device such as a laser, or one or more combinations thereof, such as along the evacuation pathway within the device along an associated suction or evacuation tube leading proximally from the device. Using an additional secondary fragmentation mechanism for ongoing anti-clogging can help promote continuity of the medical procedure and can help avoid having to stop in the middle of a treatment procedure to anti-clog the device.

For example, a calculi fracture device can include an acoustic transducer for transferring acoustic energy via a primary fragmentation probe to fracture a calculi mass into calculi fragments. The device can have an evacuation pathway extending through the device and a suction or evacuation tube, such as for connecting a distal end of the probe to a suction or other pressure source. A secondary fragmentation device can be located in or along the evacuation pathway, such as to help further break up the calculi fragments, which can help inhibit clogging at a more proximal location along the evacuation pathway.

In an example, a method of inhibiting clogging of a calculi fracture device can include receiving, from a primary fragmentation device, one or more fragments of a calculi mass along an evacuation pathway of the calculi fracture device. The calculi fragments can be further broken up along the evacuation pathway such as at a location that is more proximal to the location of the primary fragmentation device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 7A-7C illustrate schematic diagrams of an example of portions of a cutting implement configuration for secondary fragmentation such as for a calculi fracture device.

DETAILED DESCRIPTION

Examples of systems and methods for addressing the problem of clogging by calculi mass fragments caught along an evacuation pathway in a lithotripsy device can include providing a secondary fragmentation device for further processing calculus fragments at one or more locations along the evacuation pathway that are more proximal than the distal tip used to provide primary acoustic or other fragmentation of the calculus. The evacuation pathway can extend, for example, between a distal tip of the lithotripsy device, through the body of the device, and through a suction or evacuation tube connected to the device. One or more secondary fragmentation locations can be located more proximally along the evacuation pathway, such as at one or more locations between the ultrasonic transducer and the evacuation tube. Illustrative examples of such secondary fragmentation mechanisms can include, for example, a propeller-driven blade or other blade configurations, a grinder, a laser fiber, or one or more other secondary fragmentation modalities. The secondary fragmentation device can be activated continuously such as for ongoing further breaking down of calculus fragments, or intermittently (e.g., such as on a specified schedule or in response to a sensed parameter or other trigger, such as an indication of detected clogging or detecting of one or more conditions indicating a situation prone to clogging).

Figure 1:
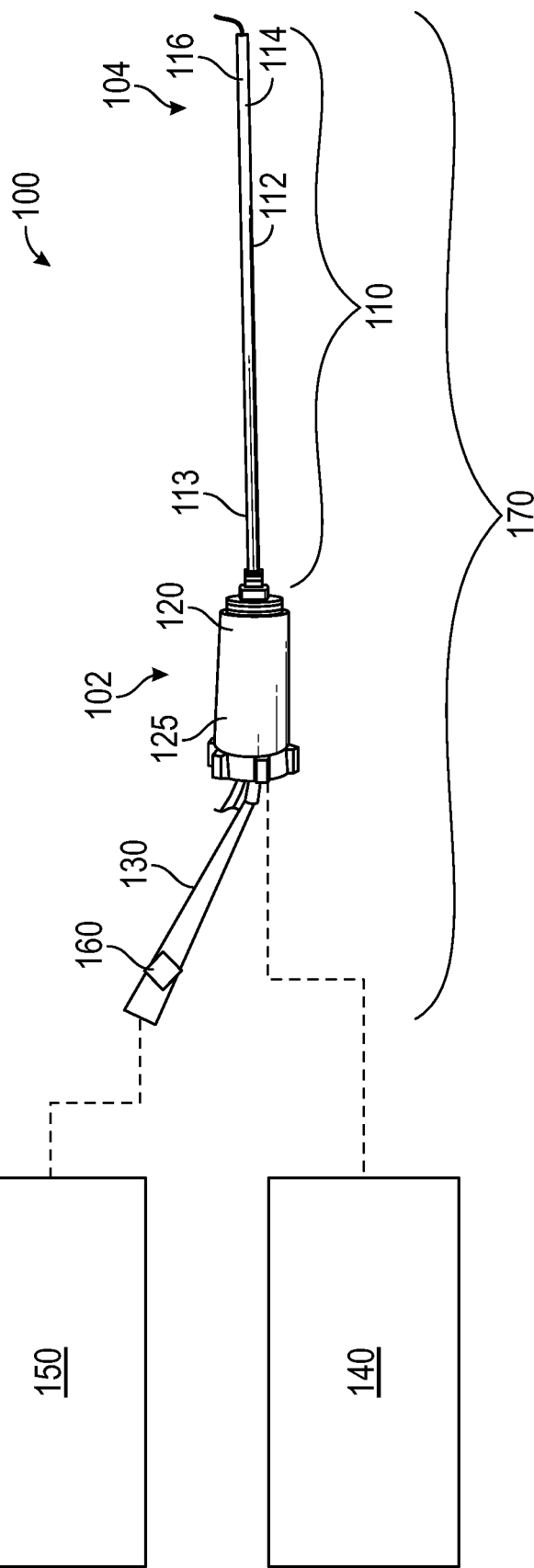
FIG. 1 illustrates a schematic diagram of an example of portions of a calculi fracture device.

FIG. 1 illustrates a schematic diagram of an example of portions of an acoustically-transmissive calculi fracture and removal device 100, such as can include a secondary fragmentation device 160. The device 100 can include a handheld portion, such as can include proximal portion 102 and a distal portion 104. The distal portion can be inserted into an opening in a patient, such as via an endoscope or other auxiliary instrument. The device 100 can include a probe 110 with a probe body 112 and a secondary fragmentation device 160. The secondary fragmentation device 160 can be located along an evacuation pathway or passage at a location that is more proximal than a distal end of the probe 110. The device 100 can also include or be coupled to one or more of an acoustic transducer 120, a handpiece 125, an evacuation tube 130, and a suction or other pressure source 140. The device 100 can be in communication with a generator 150.

The device 100 can include a lithotripsy device for treatment of calculi such as by fragmenting. The device 100 can provide lithotripsy treatment such as using ultrasonic or other acoustic energy, using low frequency solenoid-driven ballistic impact, or using any combination thereof, for fragmenting calculi or otherwise treating a physiological target. The device 100 can include a dual- or other multi-frequency device, such as can allow for pulsing of both sonic and ultrasonic waves for breakdown of calculi.

The probe 110 can be sized and shaped such as to allow for at least partial insertion into a patient, such as via an incision, such for treating calculi. The probe 110 can include an acoustically-transmissive probe for transfer of acoustic energy from a generator or acoustic transducer to a targeted calculus for fragmentation. The probe 110 can include a proximal portion 102, nearer the operator using the device, and a distal portion 104, nearer the site of treatment. The probe 110 can have a length of about 250 mm to about 600 mm, for example, depending on the specific probe type and distal probe tip used. The probe 110 can have a diameter of about 0.90 mm to about 3.80 mm, for example, depending on the specific probe type and probe tip used.

The probe 110 can include a probe body 112 extending between the proximal portion 102 and the distal portion 104, such as with a lumen also extending between the proximal portion 102 and the distal portion 104. The probe body 112 can be sized and shaped for insertion into a patient, such as to reach a calculi for fragmentation. The probe body 112 can include or can be made of a ceramic, metallic or composite material. The probe body 112 can include one or more couplers or other attachment mechanisms for coupling with the probe tip 114. The probe body 112 can allow for the operator to manipulate the placement and actuation of the probe tip 114 on or near a target calculus.

The probe tip 114 can be attached to the probe body 112. The probe tip 114 can be sized, shaped, and arranged for breaking up, fragmenting, or fracturing, one or more targeted calculi. The probe tip 114 can be attached to the probe body 112. In some cases, the probe tip 114 can include a lumen 116. When the probe tip 114 is attached by an end-user to the probe body 112, the lumen 116 of the probe tip 114 can align with and extend from the lumen 113 of the probe body 112, such as to provide a contiguous irrigation and/or evacuation pathway. The probe tip 114 can have a desired morphology or other characteristic, such as a chiseled tip, a square tip, a tip with a distally facing larger or smaller surface area, a varying topography, various morphology, or be of various materials, depending on the particular procedure to be performed or the particular target upon which the procedure is to be performed.

The acoustic transducer 120 can be actuatable for providing acoustic energy to the targeted calculi via the acoustically-transmissive probe 110. The acoustic transducer 120 can provide ultrasonic energy, sonic energy, or some combination thereof, such as to break down a targeted calculus, such as by fragmenting or dusting. In some cases, the acoustic transducer 120 can be configured for shock pulsing between various energy levels or energy types. This can include, for example, applying ultrasound energy with intermittent lower-frequency acoustic energy pulses or with intermittent ballistic mechanical energy doses. The acoustic transducer 120 can provide acoustic energy of varying waveforms or frequencies, depending on the particular operation. For example, the acoustic transducer 120 can be operated to select, adjust, or optimize the waveform for one or more portions of the procedure. The acoustic transducer 120 can be acoustically coupled to the acoustically-transmissive probe body 112, such as to provide acoustic energy down the length of the probe body 112 to the probe tip 114, which can be placed near or in contact with the targeted calculus. In an example, the acoustic transducer 120 can have a diameter of about 4 to about 6 cm, a length of about 15 to about 25 cm, and a weight of about 0.4 to about 1.0 kg, depending on the specific transducer used.

The handpiece 125 can be shaped and sized to allow for the end-user operator to grip and manipulate the device 100. In an example, the handpiece 125 can house all or a portion of the acoustic transducer 120. The handpiece 125 can include one or more buttons or another user interface means such as to allow the operator to control the device 100. For example, the handpiece 125 can include a dial for variable suction control in communication with the pressure source 140. In an example, the handpiece can include one or more buttons for applying ultrasonic, sonic, or other energy from the acoustic transducer 120, to apply to the targeted calculus for fragmentation. In some examples, the system can additionally or alternatively include a foot pedal or other auxiliary actuator, such as for controlling activation of the acoustic transducer 120.

The evacuation tube 130 can be fluidly connected to the lumen 113 of the probe 110, such as to provide irrigation, suction, or both to the device 100. The evacuation tube 130 can extend outwards from the handpiece 125 towards a pressure source 140 or other pressure source. The pressure source 140 can provide an evacuation pressure down the length of the evacuation tube 130 to draw fragments of fractured calculi down the evacuation tube 130 away from the lumen 113 of the probe 110. The evacuation tube 130 can additionally be irrigated as desired. The evacuation tube 130 can be one portion of a larger evacuation pathway 170 along which calculi fragments are removed.

The generator 150 can be in electrical communication with the device 100, such as to provide electrical energy to the device 100 during use. The generator 150 can provide electrical energy to power the acoustic transducer 120 to generate ultrasound or other acoustic or ballistic energy such as for fragmenting a targeted calculus. In an example, the generator 150 can provide AC electrical energy of about 90 to about 264 volts (peak-to-peak). The electrical energy signal provided by the generator 150 can be changed (e.g., amplitude, frequency, pulse width, modulation, etc.) such as can depend on the particular treatment to be performed, and the desired parameters.

The device 100 can additionally include a secondary fragmentation device 160 such as can be located in or along an evacuation pathway 170, such as at any location that is more proximal than a distal end of the probe tip 114 that can provide the primary fragmentation of a target calculus. The evacuation pathway 170 can include the evacuation tube 130, the lumen 113 of the probe body 112, and the lumen 116 of the probe tip 114. The secondary fragmentation device 160 can be a device integrated with the calculi fracture and removal device 100 such as for further fragmentation of a calculi mass in the pathway to inhibit, prevent, or disrupt clogging. Illustrative examples of such secondary fragmentation devices are shown and described below with reference to FIGS. 2-8, such as to help cut calculi fragments or grind calculi fragments. In either case, the resulting reduced-size calculi fragments are less likely to clog any more proximal portion of the evacuation pathway 170, such as at one or more clog-prone areas, such as at joints or kinks therein. Thus, the use of a secondary fragmentation device 160 can help inhibit or prevent clogging in the device 100.

Figure 2:
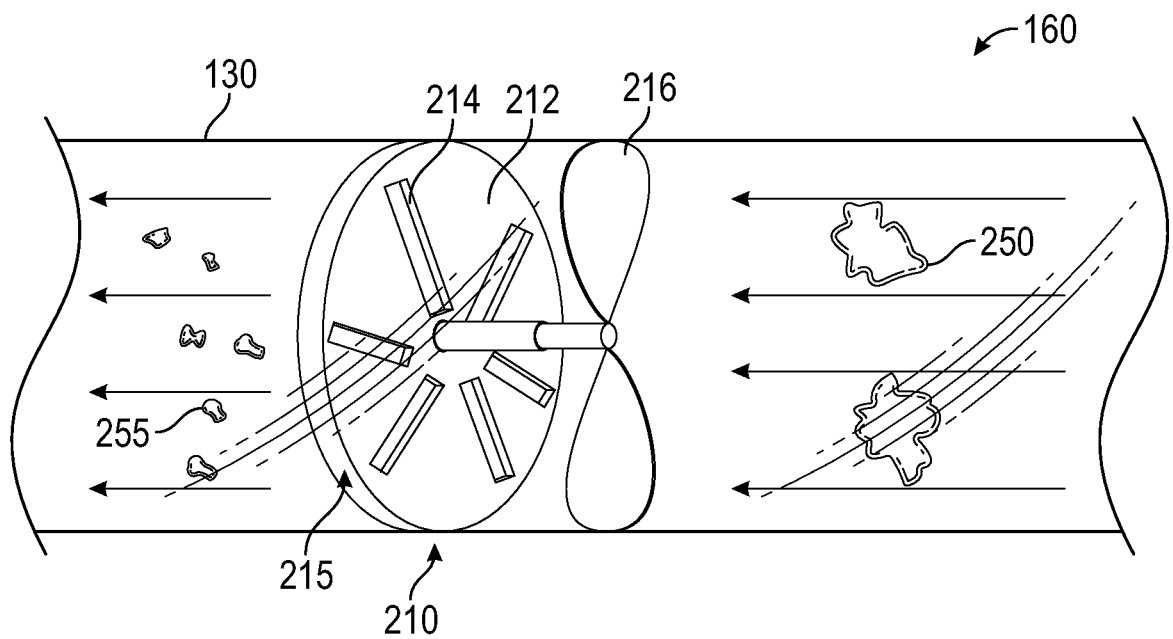
FIG. 2 illustrates a schematic diagram of an example of portions of a rotating blade configuration for secondary fragmentation or anti-clogging in a calculi fracture device.

FIG. 2 illustrates a schematic diagram of a rotating blade secondary fragmentation device 160 such as for helping to address or avoid anti-clogging a calculi fracture device such as device 100 above. The secondary fragmentation device 160 can be located along the evacuation pathway 170, such as in the evacuation tube 130. The secondary fragmentation device 160 can include a cutting implement 210 such as with a blade 212 having slots 214, a retention feature 215, and propeller 216. The secondary fragmentation device 160 can aid in further fragmenting calculi fragments 250 to smaller calculi fragments 255 as the fragments move away from a distal end of the probe 110 treating the targeted calculi mass, and towards an outlet for disposal.

The cutting implement 210 can be mounted within the evacuation pathway 170, such as in the evacuation tube 130. In some cases, the secondary fragmentation device 160 can be located in a lumen 113 of the probe body 112, the lumen 116 of the probe tip 114, or both. The cutting implement 210 can include a rotating blade 212 actuatable to cut, crush, or otherwise disintegrate the incoming calculi fragments 250 into smaller fragments 255. The blade 212 can include one or more slots 214 with sharp edges angled such that incoming calculi fragments 250 can be cut as the blade 212 rotates relative to the evacuation tube 130.

The cutting implement 210 can have a retention feature 215 around the inner circumference of the evacuation tube 130 in which the rotating blade 212 can sit. The retention feature 215 can be, for example, a fixed bearing situated in the passage. In some examples, the retention feature 215 can be a recessed groove in which the rotating blade 212 sits. In some examples, the retention feature can include circumferential protrusions in the passage in which the rotating blade 212 sits. In some cases, the retention feature 215 can allow for friction reduction. The retention feature 215 can allow for the rotating blade 212 to rotate relative the retention feature 215. The retention feature 215 can be secured to the inside surface of the evacuation tube 130.

A turbine or other propeller 216 can provide propulsion to the rotating blade 212 for cutting of the calculi fragments 250. The propeller 216 can be situated downstream or upstream of the blade 212, and can be mechanically coupled to the blade 212, such as near a central portion of the blade 212. In some cases, the propeller 216 or other propulsion component can be rotated by the flow of irrigation or other fluid from the probe 110 through the evacuation tube 130. The cutting implement 210 can be continuously actuated by the propeller 216 or can be actuated in a pulsed or scheduled manner such as by varying the suction and/or irrigation to modulate the flow and thereby modulate rotation of the rotating blade 212 or another cutting implement 210. Alternatively, the rotating blade 212 or other rotating cutting implement can be electromechanically actuated, such as by being configured as a motor rotor, instead of being actuated by fluid flow, such as with a motor stator located outside of the evacuation pathway but adjacent to the motor rotor. The rotating blade 212 can be actuated on an ongoing basis during the procedure, or can be controllably electromechanically or otherwise actuated in response to a trigger condition, such as a sensed indication of increased potential clogging.

Figure 3:
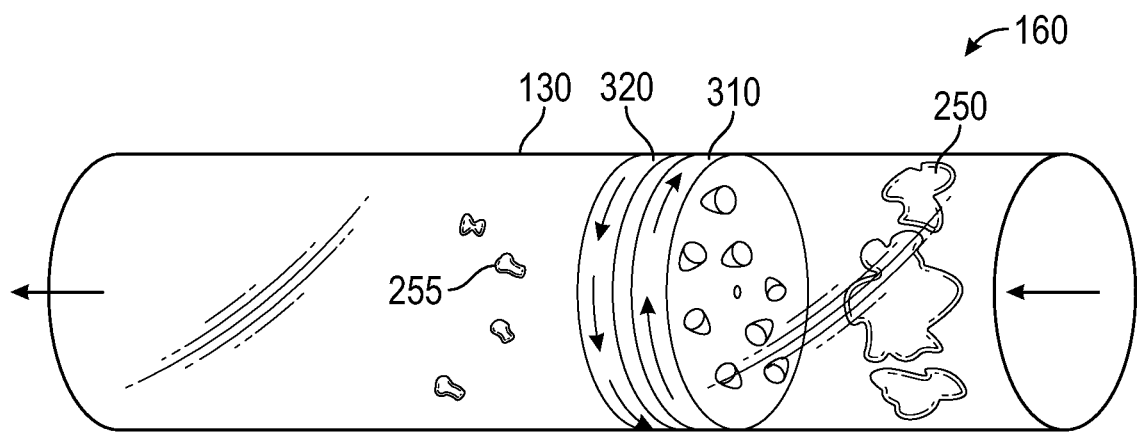
FIG. 3 illustrates a schematic diagram of an example of portions of a dual rotating blade configuration such as for secondary fragmentation and anti-clogging a calculi fracture device.

FIG. 3 illustrates a schematic diagram of an example of portions of a dual rotating blade secondary fragmentation device 160 for anti-clogging a calculi fracture device such as the device 100 discussed above. The secondary fragmentation device 160 can include a first blade 310 and a second blade 320. The blades 310 and 320 can be situated in the evacuation tube 130 of the evacuation pathway 170, such that incoming calculi fragments 250 pass through and are cutting by the blades 310, 320, while moving in the direction of fluid flow in the evacuation tube 130. In some cases, the secondary fragmentation device 160 can be located in other portions of the evacuation pathway 170, such as in the lumen 113 of the probe body 112 or in the lumen 116 of the probe tip 114.

The blades 310, 320, can be similar to the rotating blade 212 discussed above, in that the blades 310, 320, can be shaped and sized so that they reside in the evacuation tube 130 and rotate within the evacuation tube 130 to effect cutting of incoming calculi fragments 250. In some cases, the blades 310, 320, can be located in another part of the evacuation pathway, such as in a lumen 113 or 116. The blades 310, 320, can be flush against each other or spaced apart within the evacuation tube 130. The blades 310, 320 can be spaced to allow for additional fragmentation of the calculi fragments 250 into smaller fragments 255 without clogging between the two blades 310, 320.

The blades 310, 320, can rotate in the same direction, or can counter-rotate in opposite directions to each other such as to inhibit or prevent additional clogging between the blades 310, 320. Where the blades 310, 320 counter-rotate in opposite directions, the rapid movement of the blades in opposing directions can help grind or further fragment the calculi fragments 250 without creating additional blockage between the blades 310, 320. In some cases, additional blades can be situated within the evacuation tube, such as three, four, or more blades along the evacuation tube 130 or elsewhere along the evacuation pathway 170. The blades 310, 320, can be mechanically, electrically, or fluidly actuated, as desired, such as with adjacent blades counter-rotating in opposite directions, if desired, to create a counter current flow. For example, the blades 310, 320 can be coupled to a mechanical component that runs to the blades 310, 320, in the evacuation pathway 170, but is coupled to an actuator external to the evacuation pathway 170, such as at the handpiece 125 for user activation. For example, the blades 310, 320 can be coupled to a wire for electrical actuation, the wire can run along the evacuation pathway 170 and be coupled to a manual or automated mechanism for activation by the user or system. In some cases, a propulsion mechanism such as a mechanical or physical gear or propeller, can be used to actuate the blades 310, 320, in which case the actuator can be connected to the blades 310, 320, within the pathway. In some cases, an external actuator, such as an external magnetic actuator, can be used. In this case, one or more magnetic discs or other magnets can be externally aligned with the blades 310, 320, and the materials and movement of the magnetic discs can be correlated to allow magnetic propulsion of the blades 310 and 320 when in operation.

The blades 310, 320, can be configured to rotate continuously during operation of the device 100, can be on a set schedule for rotation, such as a pulsatile schedule, or can be manually actuated as desired. The speed of rotation of the blades 310, 320, can be changed depending on the characteristics of the calculi fragments 250 coming into the evacuation pathways 170 towards the secondary fragmentation device 160. The blades 310, 320, for example, can be continuously rotated to aid in reducing size of incoming calculi fragments, and the speed of rotation can be varied according to the user preference or an operation schedule. Other types of secondary fragmentation devices can be started and stopped automatically, on a schedule, or in response to an indication of a clog, such as by operator view of a reduction in suction.

Figure 4:
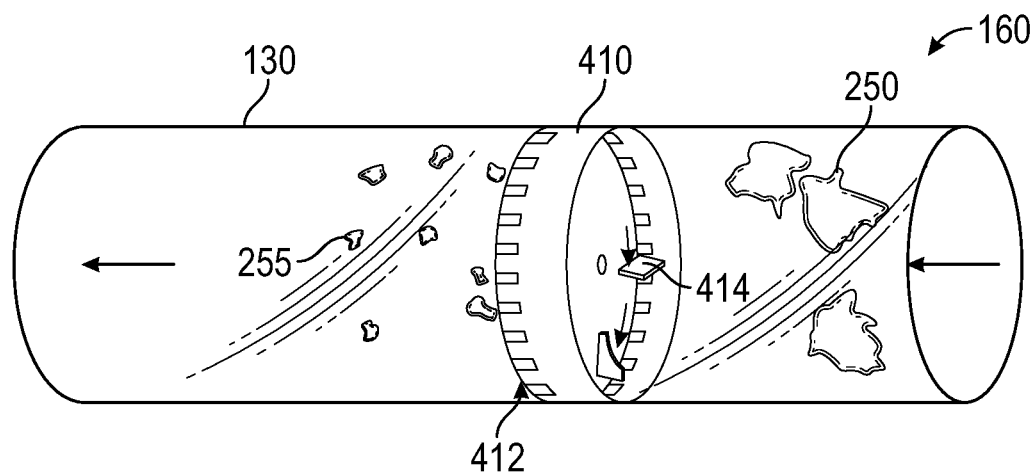
FIG. 4 illustrates a schematic diagram of an example of portions of a ringed rotating blade configuration for secondary fragmentation such as for anti-clogging a calculi fracture device.

FIG. 4 illustrates a schematic diagram of a ringed rotating blade secondary fragmentation device 160 for addressing potential clogging a calculi fracture device such as device 100. In secondary fragmentation device 160, a grinding ring 410 situated in the evacuation tube 130 can reduce the size of incoming calculi fragment 250. The grinding ring 410 can include grates 412 around a circumference of the ring 410 and one or more impellers 414 secured to the ring 410. The grinding ring 410 can, for example, skive cut incoming fragments.

The grinding ring 410 can be actuated so that it rotates within the evacuation tube 130. In some cases, the grinding ring 410, can be located in another part of the evacuation pathway 170, such as in a lumen 113. The grinding ring 410 can be actuated by a mechanical or electrical actuator, or by fluid flow within the evacuation pathway 170. The grinding ring 410 can be manually actuated, continuously actuated, or automatically actuated, such as for a set schedule of pulses.

As the grinding ring 410 is rotated, the grates 412 along the circumference of the ring 410, and the impellers 414, are moved rapidly and cut down incoming calculi fragment 250. The grates 412 can be sized, shaped, or arranged to correspond to the anticipated size or hardness of the incoming calculi fragments 250. The grates 412 can includes sharp edges, such that the impellers 414 push the incoming fragments against the grates 412, allowing reduction of the size of the fragments. The grates 412 can be of similar sizes, or varying sizes, such as in a pattern or gradient around the ring 410. The grates 412 can be evenly spaced around the grinding ring 410, or unevenly spaced, as desired, depending on the type of calculi fragments being treated. In some cases, the grates 412 can be stationary with the impellers 414 moving.

Similarly, the impellers 414 can be larger or smaller depending on the anticipated size of the calculi fragments 250 entering the evacuation tube 130. The impellers 414 can be shaped like blades, as triangles, diamonds, or other appropriate shapes. The impellers 414 can be evenly spaced around the ring 410, or unevenly spaced. The impellers 414 can each have at least one portion or edge that is sufficiently sharp to further breakdown the incoming calculi fragments 250 into smaller fragments 255.

Figure 5A:
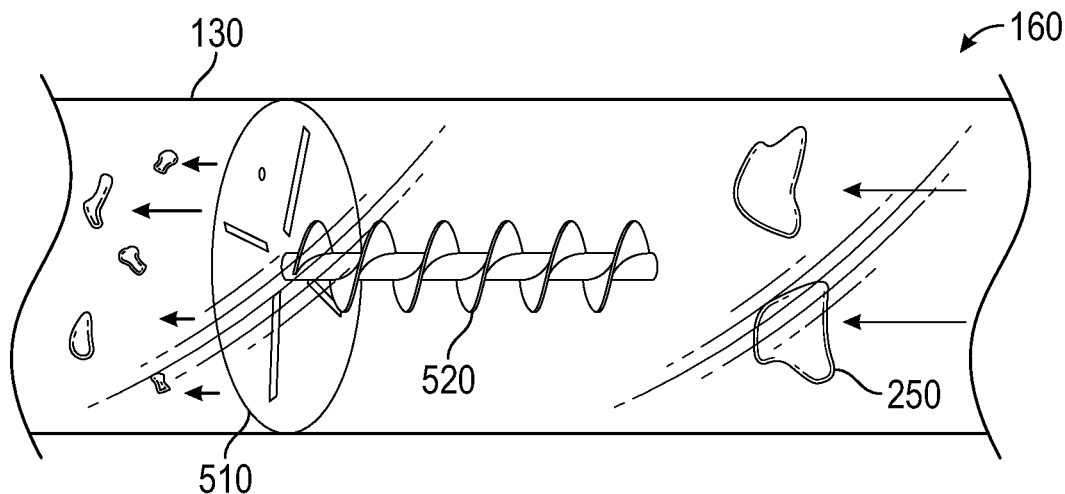
FIGS. 5A-5B illustrate schematic diagrams of an example of portions of an auger configuration for secondary fragmentation such as for anti-clogging a calculi fracture device.
Figure 5B:
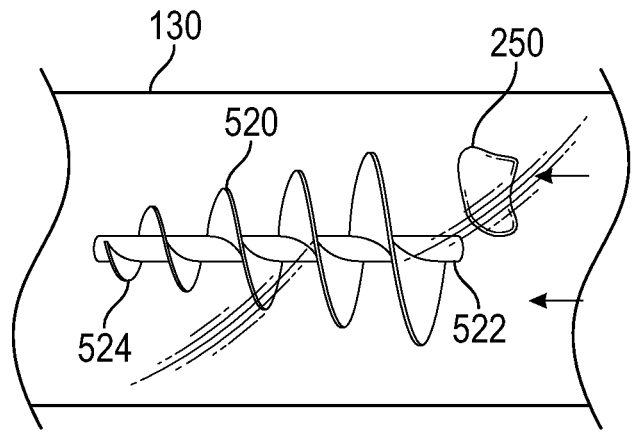

FIGS. 5A-5B illustrate schematic diagrams of an auger secondary fragmentation device 160 for addressing clogging a calculi fracture device such as device 100. The secondary fragmentation device 160 can include a rotating blade 510 and an auger bit 520 with first end 522 and second end 524. The device 160 can act as an auger.

The secondary fragmentation device 160 can be situated in the evacuation tube 130, or in a lumen 113 or 116 on the evacuation pathway 170 in the device 100. The rotating blade 510 can be similar to any of the rotating blades discussed above. The auger bit 520 can have a decreasing diameter across a plane of the bit, from the first end 522 to the second end 524. The auger bit 520 can be mechanically coupled or secured to the rotating blade 510. The auger bit 520 can be situated distal of the blade 510, and when actuated, cause the blade 510 to rotate. The auger bit 520, can be mechanically, electrically, or fluidly actuated, as desired.

The auger bit 520, can be configured to rotate continuously during operation of the device 100, can be on a set schedule for rotation, or can be manually actuated as desired. The auger bit 520 can additionally help drive fragments of calculi fragments 250 through the evacuation tube 130 as it rotates, such as to create a funneling effect. The auger bit 520 can be disposed about an axis parallel to or coaxial with the longitudinal axis of the evacuation tube 130.

Figure 6A:
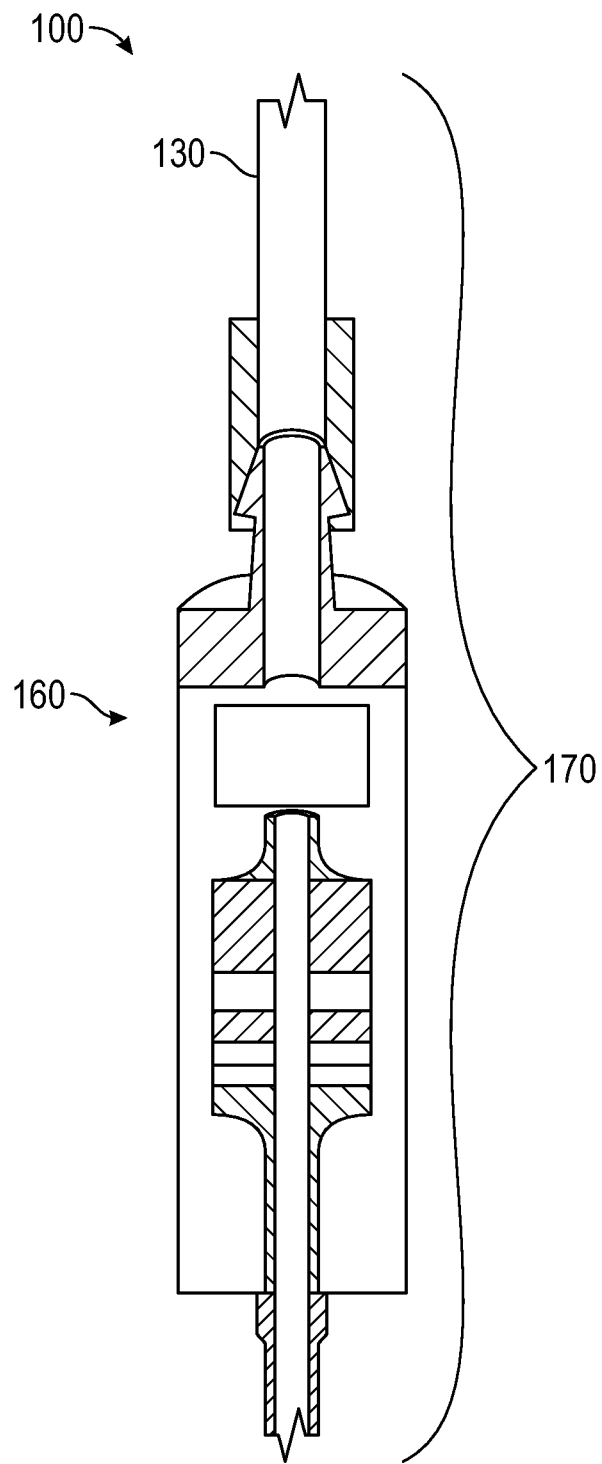
FIGS. 6A-6B illustrate schematic diagrams of an example of portions of a burr grinder configuration for secondary fragmentation such as for anti-clogging a calculi fracture device.
Figure 6B:
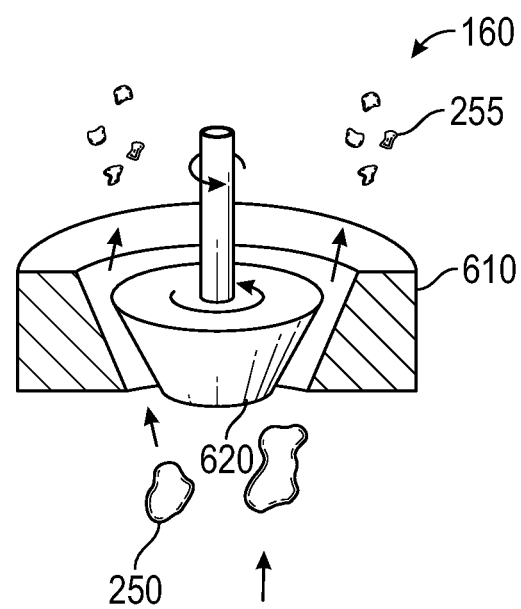

FIGS. 6A-6B illustrate schematic diagrams of a grinder secondary fragmentation device 160, such as a burr grinder, for addressing clogging a calculi fracture device, such as device 100. Here, the burr grinder device 160 can be situated in the evacuation pathway 170 between the acoustic transducer 120 and the evacuation tube 130. In some examples, the secondary fragmentation device 160 can be located elsewhere along the evacuation pathway 170, such as in the evacuation tube 130, or in the probe body 112 lumen 113 or the probe tip 114 lumen 116.

The burr grinder device 160 can include an outer portion 610 and an inner portion 620. The inner portion 620 can fit in the outer portion 610, with a small amount of clearance between where calculi fragments 250 can enter and be ground. The two portions 610, 620, can include rough surfaces, and can be rotated in opposing directions, so that calculi fragments 250 that enter the burr grinder are made smaller. In some cases, one portion of the grinder can remain stationary while the other portion is rotated. The burr grinder can be mechanically, electrically, or fluidly actuated, as desired. In some cases, other types of grinders can be used.

FIGS. 7A-7C illustrate schematic diagrams of a cutting implement secondary fragmentation device 160 for a calculi fracture device such as device 100. The cutting implement secondary fragmentation device 160 can be situated in the evacuation tube 130, or in another lumen of the device 100 along the evacuation pathway 170. This secondary fragmentation device 160 can be situated along a fixed node of the standing wave produced in the device, as nodes can be prone to clogging or reduced flow. The cutting implement secondary fragmentation device 160 can include a cutting feature 710 with various cutting surfaces 712 rigidly fixed in the fluid pathway of the evacuation tube 130. Shown in FIG. 7B, the cutting feature 710 can have a cross shape, or other bars or patterns fixed in the evacuation tube 130, to allow for fluid flow through one or more fluid flow areas.

Shown in FIG. 7C, the various cutting surfaces 712 can be facing outwards to receive one or more calculi fragments. When activated, the cutting feature 710 can vibrate and be driven by the same acoustic energy as the device 100. Oscillating of the cutting feature 710 can drive cutting of calculi fragments flowing through the evacuation tube 130 and the cutting feature 710. In some examples, a different shaped implement can be used within the pathway 170. For example, one or more discs or static vibrating blades can be placed within the pathway with cutting surfaces situated so that when the discs oscillate with the acoustic energy of the device, incoming calculi fragments are sliced. Various implements can be mounted within the pathway 170 to oscillate forward-and-back or side-to-side, depending on how the implement is mounted and in what direction the cutting surface(s) face, and subsequently aid in reduction of size of incoming calculi fragments.

Figure 8:
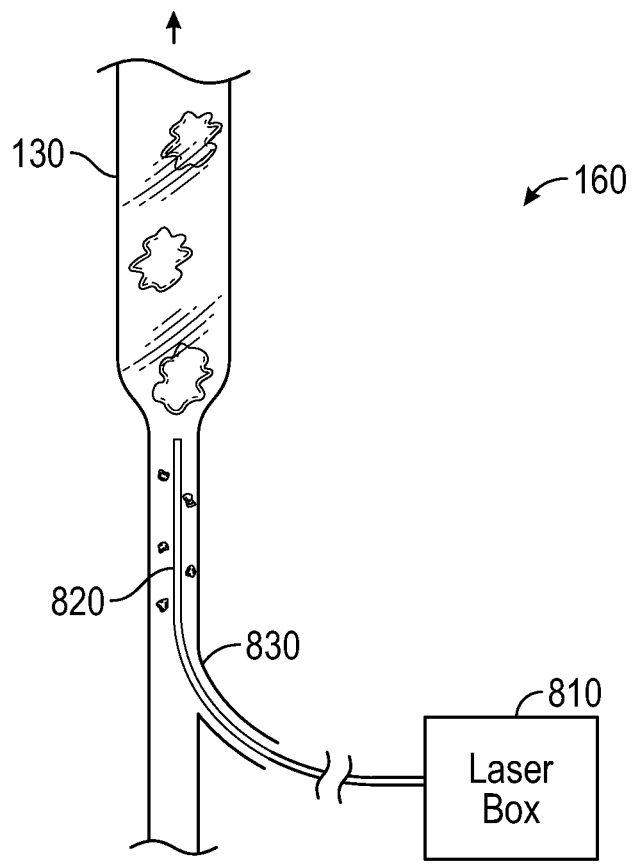
FIG. 8 illustrates a schematic diagram of an example of portions of a laser fiber configuration for a calculi fracture device.

FIG. 8 illustrates a schematic diagram of a laser fiber secondary fragmentation device 160 for use with a calculi fracture device, such as device 100. In FIG. 8, a standalone laser fiber can be used to further fragment calculi fragments. In some cases, a laser fiber can be integrated with any of the secondary fragmentation devices discussed above with reference to FIGS. 2-7C.

In FIG. 8, a laser source 810 can be connected to a laser fiber 820, with the laser fiber 820 extending into the evacuation pathway through an access port 830. The laser fiber 820 can be positioned so that it runs along a lateral axis of the evacuation pathway 170, such as in the evacuation tube 130 or a lumen of the probe 110. The laser fiber 820 can be sized, shaped, and arranged to direct a laser at incoming calculi fragments so as to reduce their size.

Figure 9:
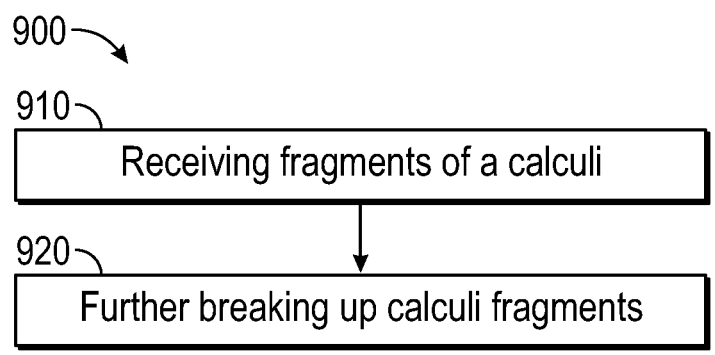
FIG. 9 illustrates a flow chart depicting an example of portions of a method for addressing clogging a calculi fracture device.

FIG. 9 illustrates a flow chart depicting a method 900 of inhibiting clogging of a calculi fracture device. The method 900 can include in step 910 receiving, from a primary fragmentation device, fragments of a calculi mass along a passage of a evacuation pathway of the calculi fracture device and in step 920 further breaking up the calculi fragments along the passage of the evacuation pathway at a location that is more proximal to a primary fragmentation location.

In step 920, further breaking up calculi fragments can include a variety of methods, including applying laser energy to the calculi fragments, or applying mechanical force to the calculi fragments by cutting or grinding the calculi fragments. Breaking up calculi fragments can be done continuously, in a pulsatile manner, or in response to an indication of a clog. Breaking up calculi fragments can be accomplished, for example, using any of the secondary fragmentation devices discussed above with references to FIGS. 2-8.

Each of these non-limiting examples can stand on its own or can be combined in various permutations or combinations with one or more of the other examples.

Example 1 can include a calculi fracture device comprising an acoustic transducer for transferring acoustic energy via a primary fragmentation probe to fracture a calculi mass into calculi fragments, an evacuation tube connecting the probe to a pressure source, wherein an evacuation pathway extends through the primary fragmentation probe and the evacuation tube; and a secondary fragmentation device located in the evacuation pathway to further break up the calculi fragments to inhibit clogging at a more proximal location in the evacuation pathway.

Example 2 can include Example 1, wherein the secondary fragmentation device comprises a rotating cutting implement located in the evacuation pathway.

Example 3 can include any of Examples 1-2, further comprising a propulsion mechanically coupled to the rotating cutting implement to induce rotation of the rotating cutting implement in response to a flow through the evacuation pathway.

Example 4 can include any of Examples 1-3, the cutting implement comprising a retention feature secured to the evacuation pathway and rotating cutting implement to permit rotation of the cutting implement with respect to the fixed bearing.

Example 5 can include any of Examples 1-4, wherein the rotating cutting implement comprises at least two rotating cutting implements located along the evacuation pathway.

Example 6 can include any of Examples 1-5, wherein the rotating cutting implement comprises two or more counter-rotating cutting implements.

Example 7 can include any of Examples 1-6, wherein a rotation axis of the rotating cutting implement is parallel or coaxial to a longitudinal axis of the evacuation pathway.

Example 8 can include any of Examples 1-7, wherein the evacuation tube is coupled to the acoustic transducer to permit passage of acoustic energy from the primary fragmentation probe to the calculi.

Example 9 can include any of Examples 1-8, further comprising an auger in the evacuation pathway and located distal of the secondary fragmentation device.

Example 10 can include any of Examples 1-9, wherein the auger comprises an auger bit disposed about an axis parallel to or coaxial with a longitudinal axis of the evacuation pathway.

Example 11 can include any of Examples 1-10, wherein the secondary fragmentation device comprises a grinder.

Example 12 can include any of Examples 1-11, wherein the grinder comprises a rotating grinder having a circumferential piece with a plurality of cutting implements thereon.

Example 13 can include any of Examples 1-12, wherein the secondary fragmentation device comprises a laser fiber.

Example 14 can include a method of inhibiting clogging of a calculi fracture device. The method can include receiving, from a primary fragmentation device, fragments of a calculi mass along a passage of an evacuation pathway of the calculi fracture device and further breaking up the calculi fragments along the passage of the evacuation pathway at a location that is more proximal to a primary fragmentation location.

Example 15 can include Example 14, wherein further breaking up calculi fragments comprises applying laser energy to the calculi fragments.

Example 16 can include any of Examples 1-15, wherein further breaking up calculi fragments comprises applying mechanical force to the calculi fragments.

Example 17 can include any of Examples 1-16, wherein applying mechanical force comprises cutting the calculi fragments.

Example 18 can include any of Examples 1-17, wherein applying mechanical force comprises grinding the calculi fragments.

Example 19 can include any of Examples 1-18, wherein further breaking up calculi fragments is done continuously.

Example 20 can include any of Examples 1-19, wherein further breaking up calculi fragments is done in a pulsatile manner.

Example 21 can include any of Examples 1-20, wherein further breaking up calculi fragments is initiated in response to a condition indicative of a clog.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A calculi fracture device comprising:
an acoustic transducer for transferring acoustic energy via a primary fragmentation probe to fracture a calculi mass into calculi fragments;

an evacuation tube connecting the probe to a pressure source, wherein an evacuation pathway extends through the primary fragmentation probe and the evacuation tube;

a secondary fragmentation device located in the evacuation pathway to further break up the calculi fragments to inhibit clogging at a more proximal location in the evacuation pathway, the secondary fragmentation device comprising a rotating blade including at least one ring or disk structure.

2. The device of claim 1, further comprising a propulsion mechanically coupled to the rotating blade to induce rotation of the rotating blade in response to a flow through the evacuation pathway.

3. The device of claim 1, the rotating blade comprising a retention feature secured to the evacuation pathway and rotating blade to permit rotation with respect to the retention feature.

4. The device of claim 1, wherein a rotation axis of the rotating blade is parallel or coaxial to a longitudinal axis of the evacuation pathway.

5. The device of claim 1, wherein the evacuation tube is coupled to the acoustic transducer to permit passage of acoustic energy from the primary fragmentation probe to the calculi.

6. The device of claim 1, wherein the rotating blade comprises at least two counter-rotating blades located along the evacuation pathway.

7. The device of claim 6, wherein one of the at least two counter-rotating blades drives the other of the at least two counter-rotating blades.

8. The device of claim 1, further comprising an electrical actuation mechanism configured to automatically actuate the secondary fragmentation device based on a parameter of the calculi fragments.

9. The device of claim 1, wherein an outer perimeter of the ring or disk structure is in contact with an inner surface of the evacuation pathway.

10. A method of inhibiting clogging of a calculi fracture device, the method comprising:

receiving, from a primary fragmentation device, fragments of a calculi mass along a passage of an evacuation pathway of the calculi fracture device;

further breaking up the calculi fragments along the passage of the evacuation pathway at a location that is more proximal to a primary fragmentation location, wherein further breaking up calculi fragments comprises applying mechanical force to the calculi fragments, wherein applying mechanical force comprises cutting the calculi fragments with two counter-rotating blades; and automatically, in response to at least one of the receiving fragments of the calculi mass or the further breaking up the calculi fragments, adjusting the mechanical force based on one or more parameters comprising pressure differences or flow rate.

11. The method of claim 10, wherein further breaking up calculi fragments is done continuously.

12. The method of claim 10, wherein further breaking up calculi fragments is done in a pulsatile manner.

* * * * *